J. M. BUKACEK.
MACHINE OILER.
APPLICATION FILED JULY 14, 1919.
1,337,688.
Patented Apr. 20, 1920.
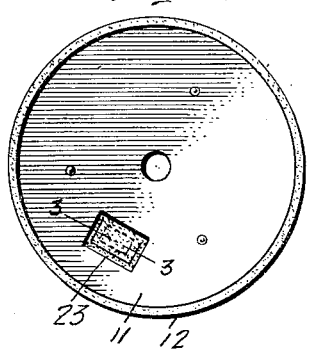
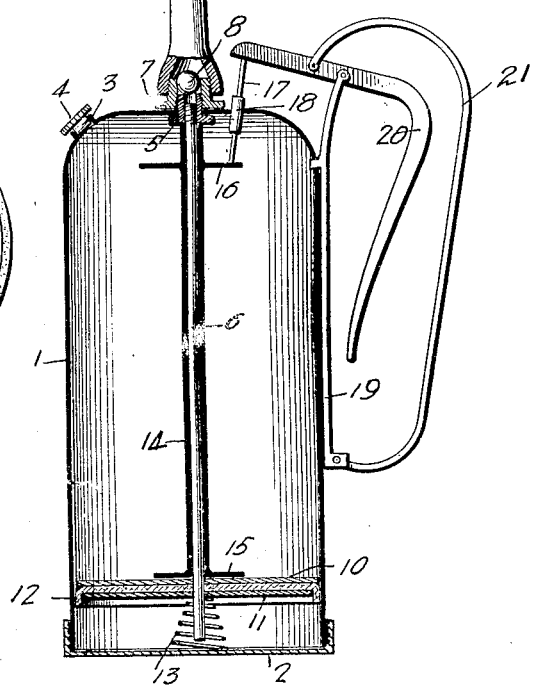
WITNESSES
R. E. Rousseau.
C. E. Trimon.
INVENTOR
J. M. Bukacek,
BY Munn & Co.
ATTORNEYS

UNITED STATES PATENT OFFICE.

JOSEPH M. BUKACEK, OF CLARKSON, NEBRASKA.

MACHINE-OILER.

1,337,688.   Specification of Letters Patent.   Patented Apr. 20, 1920.

Application filed July 14, 1919. Serial No. 310,809.

*To all whom it may concern:*

Be it known that I, JOSEPH M. BUKACEK, a citizen of the United States, and a resident of Clarkson, in the county of Colfax and State of Nebraska, have invented certain new and useful Improvements in Machine-Oilers, of which the following is a specification.

My invention is an improvement in machine oilers, and has for its object to provide an oiler adapted for use with machinery of any character, which may be made to positively deliver oil when desired, whatever the position of the oiler.

In the drawings:

Figure 1 is a vertical section of the improved oiler;

Fig. 2 is a bottom plan view of the plunger;

Fig. 3 is a section on the line 3—3 of Fig. 2.

In the present embodiment of the invention, the improved oiler comprises a casing consisting of a body 1 and a bottom 2 which is threaded into engagement with the body and is removable, when desired, for any purpose. This body has a filling nipple 3 at its top and at one side, which is normally closed by a plug 4.

The top has a central opening, and within this opening is arranged a bushing 5. A pipe 6 is threaded into the bushing at the upper end of the pipe, and the said pipe extends to near the lower end of the casing, that is, to near the bottom 2. A second bushing 7 is threaded on to the bushing 5 outside of the can body and the two bushings 5 and 7 serve to hold the pipe 6 in proper position with respect to the body.

The bushing 7 is also a cage for a check valve 8, a ball valve in the present instance, which coöperates with the upper end of the bushing 5 as a seat. A suitable spout 9 has threaded engagement with the bushing 7, and this spout serves to prevent dislodgment of the ball check, while at the same time permitting access to the check by the removal of the spout.

A plunger is mounted to slide on the pipe, the said plunger consisting of upper and lower disks 10 and 11 which are secured together and have clamped between them a leather packing disk 12. This plunger is mounted to slide on the pipe 6, and it is normally pressed upward by a spring 13 arranged between the plunger and the bottom of the body of the oiler.

A sleeve 14 is mounted to slide on the pipe 6 and this sleeve has at its lower end an annular flange or washer 15, which bears against the plunger. At its upper end, when the plunger is in its uppermost position, the sleeve bears against the lower end of the bushing 5, and the sleeve has an annular radial flange 16 spaced apart from its upper end. This flange is engaged by a pin 17 which is mounted to slide through a bushing 18 in the top of the can body, and it is evident that when the pin is pushed downward the sleeve will be moved downwardly, carrying with it the plunger.

A bracket 19 is secured to the outer face of the oiler body longitudinally thereof, the said bracket extending above the body, as shown, and an elbow lever 20 is pivoted to the upper end of the bracket. One arm of this lever is in position to engage the upper end of the pin and the other arm extends downwardly between the bracket 19 and a handle 21 which is pivoted at its lower end to the bracket and at its upper end to the lever 20. The arrangement is such that when the handle 21 is pressed toward the can the pin 17 will be moved downwardly, moving the sleeve 6 downward, and with it the plunger, thus positively forcing out oil through the spout. The pin may also be operated by manipulating the lever 20 directly.

Referring to Figs. 2 and 3, it will be seen that the disks 10 and 11 have registering openings 22 and 23, respectively, the opening 23 being of considerably larger diameter than the opening 22. The packing disk 12 has a valve 24 formed by slitting the same, and this valve normally rests in the full line position of Fig. 3. When, however, the plunger moves upward against the resistance of the oil in the plunger the valve 24 may swing downwardly, as indicated in dotted lines in Fig. 3, to permit the oil to flow below the plunger.

I claim:

1. An oiler comprising a container having a spout, a pipe extending from near the bottom of the container and delivering to the spout, a check valve between the pipe and the spout, a plunger, a sleeve mounted to slide on the pipe and engaging at its lower end the plunger, a spring normally pressing the plunger upwardly, and means outside the container for forcing the plunger downwardly against the resistance of the said spring, said plunger having a check controlled by-pass, the means for moving the sleeve comprising a handle having a portion movable toward and from the container, a pin mounted to slide in the container and engaging the sleeve at its inner end, an elbow lever pivoted to the container and having one arm in position to engage the pin, the movable portion of the handle being connected to the lever to force the pin downward when the movable portion is moved inward.

2. An oiler comprising a container having a spout, a pipe extending from near the bottom of the container and delivering to the spout, a check valve between the pipe and the spout, a plunger, a sleeve mounted to slide on the pipe and engaging at its lower end the plunger, a spring normally pressing the plunger upwardly, and means outside the container for forcing the plunger downward against the resistance of the spring, said plunger having a check controlled by-pass.

3. An oiler comprising a container having a spout, a pipe extending from near the bottom of the container and delivering to the spout, a check valve between the pipe and the spout, a plunger, a sleeve mounted to slide on the pipe and engaging at its lower end the plunger, a spring normally pressing the plunger upwardly, and means outside the container for forcing the plunger downward against the resistance of the spring.

4. An oil can having a spout and a pipe delivering to the spout and extending to near the lower end of the can, a plunger movable on the pipe, a spring normally pressing the plunger upward, and means operable from the outside of the can for forcing the plunger downward, said plunger having a by-pass, and a check valve between the pipe and the spout.

JOSEPH M. BUKACEK.